United States Patent
Tedesco et al.

(10) Patent No.: US 6,259,517 B1
(45) Date of Patent: Jul. 10, 2001

(54) OPTICAL FIBER BREAKAGE DETECTION SYSTEM

(75) Inventors: James M. Tedesco, Livonia; Joseph B. Slater, Dexter; Dane D. Barlow, Ann Arbor, all of MI (US)

(73) Assignee: Kaiser Optical Systems, Inc., Ann Arbor, MI (US)

( * ) Notice: Subject to any disclaimer, the term of this patent is extended or adjusted under 35 U.S.C. 154(b) by 0 days.

(21) Appl. No.: 09/289,442

(22) Filed: Apr. 9, 1999

Related U.S. Application Data (60) Provisional application No. 60/108,752, filed on Nov. 17, 1998.

(51) Int. Cl.$^7$ .................................................. G01N 21/00
(52) U.S. Cl. ..................................... 356/73.1; 250/227.14
(58) Field of Search ........................... 356/73.1, 73, 301, 356/302–305; 250/226, 227.14, 227.15, 227.18, 227.23, 302, 303, 458.1, 461.1, 492.1, 372, 554

(56) References Cited

U.S. PATENT DOCUMENTS

| | | | |
|---|---|---|---|
| 4,673,291 | 6/1987 | Heckmann | 356/73.1 |
| 5,012,087 | * 4/1991 | Rockstroh et al. | |
| 5,270,537 | 12/1993 | Jacobs | 250/227.15 |
| 5,729,012 | 3/1998 | Wood et al. | 250/227.15 |

* cited by examiner

Primary Examiner—Frank G. Font
Assistant Examiner—Tu T. Nguyen
(74) Attorney, Agent, or Firm—Gifford, Krass, Groh, Sprinkle, Anderson & Citkowski, PC

(57) ABSTRACT

An optical-fiber breakage detection system continuously monitors the integrity of a laser-guiding fiber, whether the laser itself is on or off. If an interruption is detected, the system may cut off, lock out, or reduce laser power, as appropriate. An optical element such as a beamsplitter is used to introduce an optical test signal into one end of the fiber so that the signal is carried by the fiber to the other end where the test signal is detected and employed to perform a desired function. In the preferred embodiment, the test signal is modulated and encoded to minimize false shut-downs. The source of the optical test signal is preferably disposed at the first location and carried by a second fiber to the remote location, enabling the test signal to be compared directly to the test signal as detected. The system is useful in a variety of applications, including systems of the type wherein the laser energy is used to induce a spectral emission from a sample disposed at the remote location, as in Raman or fluorescence detection. In such a configuration one or more additional fibers may be used to carry the spectral emission back to the first location, for example, for analysis purposes.

31 Claims, 5 Drawing Sheets

PROBE HEAD

OPTICAL FIBER BREAKAGE DETECTION SYSTEM

REFERENCE TO RELATED APPLICATION

This application claims priority of U.S. provisional application Ser. No. 60/108,752, filed Nov. 17, 1998, the entire contents of which are incorporated herein by reference.

FIELD OF THE INVENTION

This invention relates generally to laser-based processes and, more particularly, to systems for determining light-path interruption when laser energy is carried over an optical fiber.

BACKGROUND OF THE INVENTION

Laser energy is now in some instances transported over relatively long distances via fiber optic cable. Such laser installations are increasingly used in industrial applications for materials processing, process monitoring, and process control.

As an example, industrial Raman spectroscopy for chemical process monitoring and control uses laser energy from a laser source installed in a central control room instrument. The instrument couples the laser energy into an optical fiber cable that is routed to a remote probe head. The remote probe head is typically installed into a pipeline that may be hundreds of meters away from the laser source.

The fiber cable connecting the remote probe head to the central instrument poses a potential hazard if it is accidentally severed at some point en route. Potential hazards caused by laser energy escaping from a severed fiber optic cable include 1) eye damage to facility personnel, and 2) heating/ignition of explosive gases.

There are many disclosed fiber-optic safety systems, but all present drawbacks in terms of complexity and/or fail-safe operation. U.S. Pat. No. 5,012,087 to Rockstroh et al, entitled FIBER OPTIC SAFETY SYSTEM, detects energy leakage from an optical fiber transmitting a high-power laser beam by providing a second fiber in the same jacket. The second fiber is connected at one end to a light source and at the other end to a photosensitive diode, such that leakage of energy from the power transmitting fiber causes the second fiber to fail, thereby reducing or terminating the transmission of light to the photosensitive diode. Although this system is simple in concept, in the event that the photosensitive diode manages to detect an appropriate amount of light even with failure of the primary fiber, fail-safe operation is not guaranteed. Furthermore, this concept requires electrical power at the remote end of the fiber to power either a light source or a photodetector, which adds the complexity of power cables and, for hazardous environments, the need for an explosion-proof enclosure.

U.S. Pat. No. 5,270,537 to Jacobs, entitled LASER INITIATED ORDINANCE SYSTEM OPTICAL FIBER CONTINUITY TEST, describes a system wherein a primary laser source used to detonate an explosive is switched out of the path of a light-carrying fiber to introduce light from a test source used to detect breaks or discontinuities. The secondary light source generates a series of light pulses which are transmitted through the length of the fiber and reflected by a dichroic coating at the opposite end. A photodetector is positioned near the test light source to detect the reflected pulses, such that if there is a break in the optical fiber, the pulse of light that is reflected will be of lower intensity than would be expected. This system is narrowly tailored for a specific purpose, requiring a large number of optical components and moving parts. This type of testing is directed to applications in which fiber continuity testing is required just prior to launching a single, short pulse of laser light on the fiber. Since the testing is not simultaneous with the transmission of the laser pulse, this approach does not meet the need of continuous monitoring of the continuity of a fiber carrying a cw laser beam.

U.S. Pat. No. 5,729,012 to Wood et al, entitled PHOTOLUMINESCENCE BUILT-IN-TEST FOR OPTICAL SYSTEMS, utilizes the same optical fiber to carry laser energy from a primary source, a test source, and wavelengths emanating and returning from the distal end of an optical fiber. In contrast to the '537 patent to Jacobs, the apparatus of Wood et al includes a photoluminescent material disposed at the junction of an optically-initiated device in the second or distal end of the optical fiber, such that, in a test mode, the photoluminescent material is exposed to light from the test source, resulting in photoluminescence at a third wavelength. The photoluminescent light travels through the optical fiber back to the detector at the source end which, when detected, is used to indicate optical fiber continuity. For applications involving spectroscopic monitoring, the photoluminescent material would produce unwanted spectral signals of its own, which might obscure or mask the desired spectral signals from the sample being monitored. Consequently, the photoluminescent approach is not suitable for applications involving the spectral analysis of various substances.

SUMMARY OF THE INVENTION

The subject invention resides in methods and apparatus for detecting the breakage of an optical fiber used to carry laser energy from a source location to a remote location. Importantly, the system requires no electrical components at the remote location, thereby avoiding electrically induced explosion hazards.

The system continuously monitors the integrity of the laser-guiding fiber, whether the laser itself is on or off. If a fiber cable interruption is detected at any point between the source and remote locations, the system may cut off, lock out, or reduce laser power, as appropriate. The invention is ideally suited to remote spectroscopic monitoring, such as industrial Raman spectroscopy, wherein optical fibers are used to interface a central instrument to a probe head.

A system according to the invention would include a laser outputting a beam of light having a wavelength at a first location, and a first optical fiber having a first end supported to receive the light from the laser and a second end to deliver the light to a remote location. An optical element is used to introduce the test signal into one end of the optical fiber so that the test signal is carried to the opposite end of the fiber, where it is detected and converted into an electrical signal. Electrical circuitry may be employed to perform a desired function, for example, to reduce or terminate power to the laser, or to prevent laser from entering the first end of the optical fiber, if the detected test signal does not meet a predetermined criterion, such as failing to reach, or falling below, a particular value.

To assist with detection, the optical test signal is preferably at a wavelength different from that of the laser. The test signal may also be modulated and/or encoded. In the preferred embodiment, the test signal, which originates at the first location, is carried by a second optical fiber to the remote location, where it is introduced into the second end of the first fiber. The test signal propagates through the first fiber to the first location, where it is separated from the path of the laser beam and detected by a suitable detector and associated electronics at the first location.

Alternatively, the test signal could be introduced to the first fiber at the first location, and separated from the laser beam path at the remote location. In this case, the second fiber is used to carry the test signal to the first location where it is sensed by the detector and electronics. Neither case requires electrical power at the remote location.

The invention is useful in a variety of applications that might benefit from fiber breakage detection, including systems of the type wherein the laser energy is used to induce a spectral emission from a sample disposed at the remote location, as in Raman or fluorescence detection. In such a configuration one or more additional fibers may be used to carry the spectral emission back to the first location, for example, for analysis purposes. Where possible, the preferred embodiment uses commercially available components, as might be manufactured for the telecommunications industry, enabling the system to be implemented at a relatively low cost.

DETAILED DESCRIPTION OF THE INVENTION

Before describing the invention in detail, it is useful to describe a prior-art configuration of a laser sensor installation that uses such a fiber optic cable. Using the example of a HoloProbe process Raman analyzer manufactured by Kaiser Optical Systems, Inc. of Ann Arbor, Mich., the basic components of interest are shown schematically in FIG. 1. The primary components include a laser 102, laser tracking beamsplitter 104, injector lens 106, laser fiber 108, probe head 110, return signal fiber 116, and spectrograph/analyzer (not shown).

Figure 1:
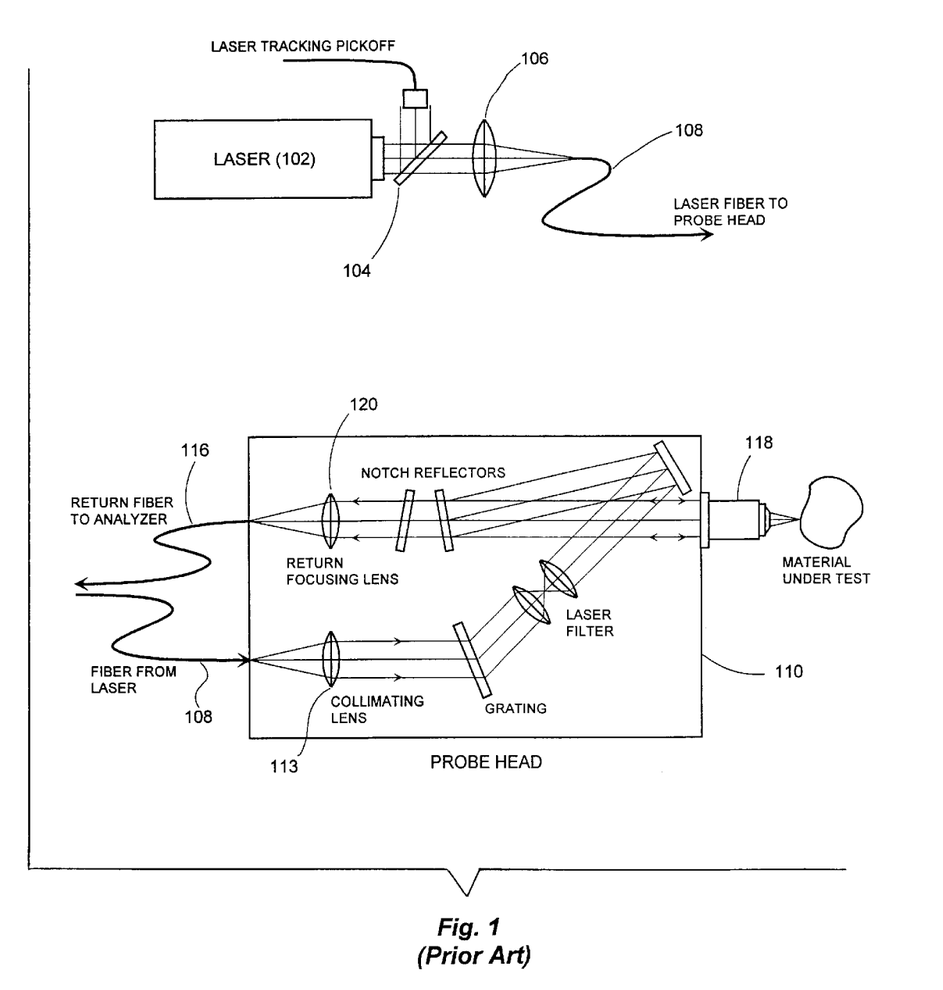
FIG. 1 is a schematic block diagram which illustrates existing fiber-coupled hardware for remote Raman spectroscopy.

The laser 102 generates collimated light of a single wavelength. The beamsplitter 104 is used in some instruments as shown to sample a very small fraction of the collimated laser beam for power and/or wavelength tracking by an analyzer. The beamsplitter may have a "v-coat" designed for minimum reflectance at the laser wavelength, so that nearly all of the laser energy continues on to the fiber. The injector lens 106 focuses the collimated light into the end of the fiber which carries the light to the probe head 110.

At the probe head 110, light emerges from the fiber 108 and is typically collimated by a lens 113. In the example now being described, additional optics are used to filter unwanted light generated in traversing the fiber. The light is folded into the path of an objective lens 118 which focuses the laser light onto the material being analyzed. The same objective lens 118 may conveniently be used to collect the strong Rayleigh scatter (un-shifted light at the laser wavelength) and the weak Raman emissions (wavelength shifted light) that carry information about the material. Additional filtering optics are typically employed to remove the Rayleigh light. A lens 120 focuses the remaining Raman light into a return fiber 116 that transmits it back to the control room for analysis. Note that the basic system just described is applicable to other forms of induced spectral emission, including fluorescence detection.

Figure 2:
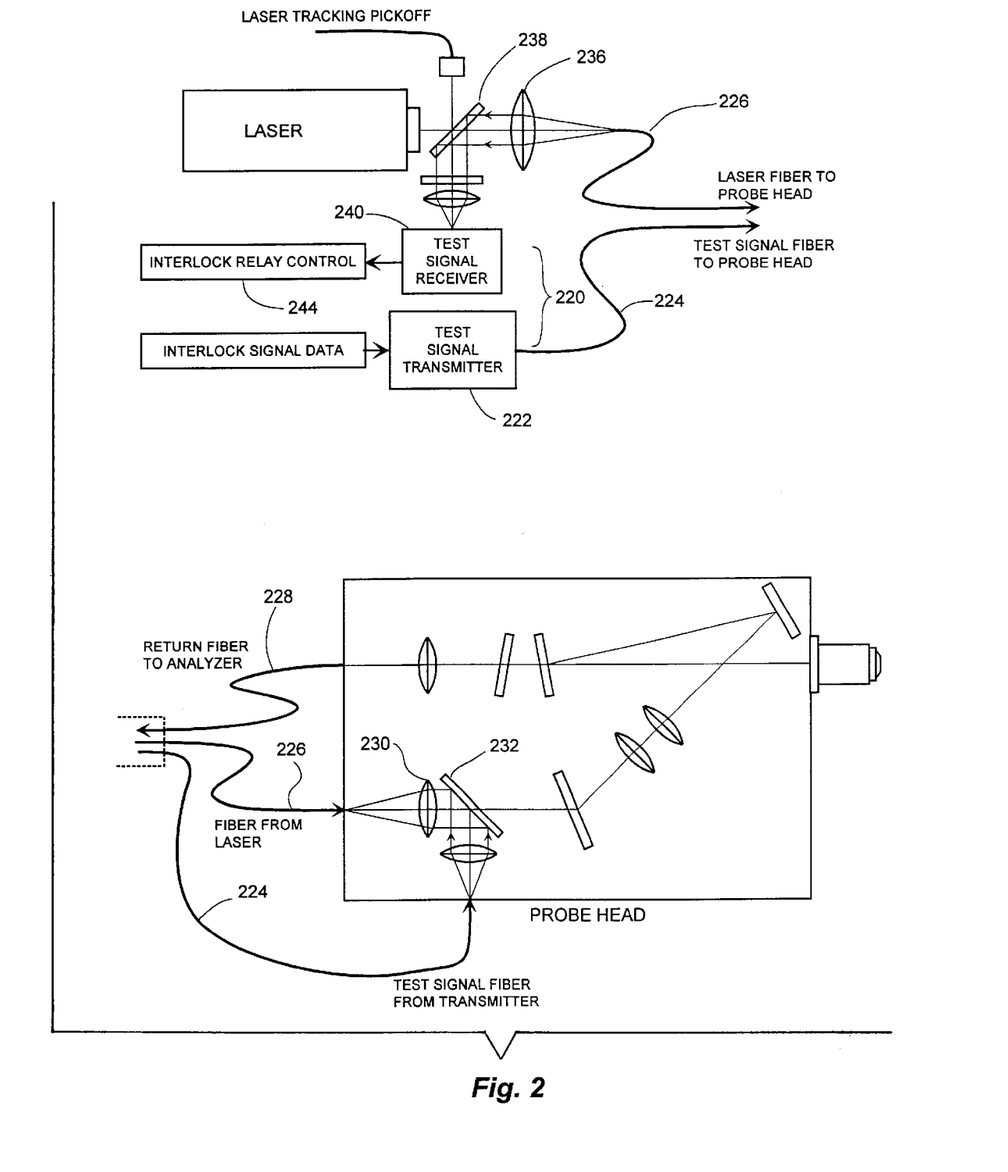
FIG. 2 is a diagram of a laser interlock according to the invention applied to the configuration of FIG. 1.

FIG. 2 shows schematically the subject invention as applied to the system of FIG. 1. For clarity, only the light path followed by the interlock signal is shown. An important component is an optical transmitter/receiver pair 220 (or transceiver) that preferably uses low-power, eye-safe light emitting diodes (LEDs) or laser diodes and silicon or InGaAs photodiode detectors to transmit and receive high data-rate digital or analog signals over fiber-optic cable. Such components are mass-produced, for example, by Hewlett-Packard (as the HFBR-0400 series) or by AMP (269xxx series) and are available at low cost for telecommunications and networking applications such as Ethernet and Token Ring for communication link distances up to 4 km.

The transmitter typically uses a solid-state emitter, preferably an AlGaAs or InGaAsP LED or laser diode operating at 820, 1300 or 1550 nm. In the preferred embodiment, the transmitted signal is a continuous digital square wave at some nominal frequency, say 1 MHZ. The signal can be binary coded as well to reduce the possibility of a false positive in the event of a fiber break. Other embodiments might include encoded transmissions in switched, multiple fiber systems to identify the fiber that has broken.

As shown, a transmitter 222 is connected directly to a fiber 224 bundled with the normal laser delivery and signal return fibers, 226 and 228, respectively. At the probe head, the optical test signal emerging from the fiber 224 is collimated, folded, and focused into the laser fiber using the existing laser collimating lens 230 operating in the reverse direction. The optical fold of the test signal is preferably carried out using a beamsplitter 232 designed to transmit nearly all of the laser energy (typically at 532 nm or 785 nm) but is reasonably reflective at the wavelength of the test signal.

It should be clear to those skilled in the art that the test signal could alternatively be injected into the laser fiber at the source location, using beamsplitter 238, for example, and detected from the laser fiber output at the remote location using beamsplitter 232, for example, and routed to the receiver over the fiber 224. Thus, the test signal propagates over its respective fibers in the opposite direction to that described above, but the operation of the breakage detection system will be otherwise the same.

Note that according to the invention the laser fiber 226 is now carrying both 1) laser energy to the probe head, and 2) the LED or laser diode test signal back from the probe head. When the test signal emerges from the laser fiber back at the laser injector, it is collimated by the existing injector lens 236 (now operating in reverse).

The beamsplitter 238 is preferably designed to be highly transmissive at the laser wavelength but reasonably reflective at the test signal wavelength. The beamsplitter reflects the collimated interlock signal light to a separate lens, which focuses the signal onto the digital receiver. As noted, the beamsplitter is preferably a standard component used for laser tracking in the Kaiser HoloProbe system used as an example. If not already present, the beamsplitter 238 may be added specifically to implement the invention. In addition, a filter may be interposed between the beamsplitter 238 and the focusing lens at the receiver to keep light at the laser wavelength from reaching the test signal detector.

The receiver 240, preferably a low-cost off-the-shelf item as well, converts the optical test signal into a TTL-compatible electrical signal. Again, this signal might take the form of a simple 1 MHZ digital square wave or complex modulated or encoded signal. The transmitter and receiver 222 and 240 are also capable of encoding and decoding at other data rates, if the application requires faster operation.

The receiver 240 may be coupled to a simple electrical circuit 244 that detects either the presence or absence of the transmitted frequency signal. The circuit 244 controls a relay that operates in series with the normal laser interlock loop. Most industrial lasers, as a built-in safety feature, feature a remote interlock connector that allows the laser to be shut down if an electrical connection is interrupted, as might be encountered by opening an instrument cover or removing a fiber connection. In the absence of the required signal, the interlock relay is opened, and the laser cannot operate. In the presence of the signal, the interlock relay is closed, and the laser can operate normally (unless, of course, some other interlock switch in the loop is opened). Using this system, any interruption of the laser fiber integrity will result in the absence of the optical test signal at the receiver, and immediately disable the laser.

Figure 3:
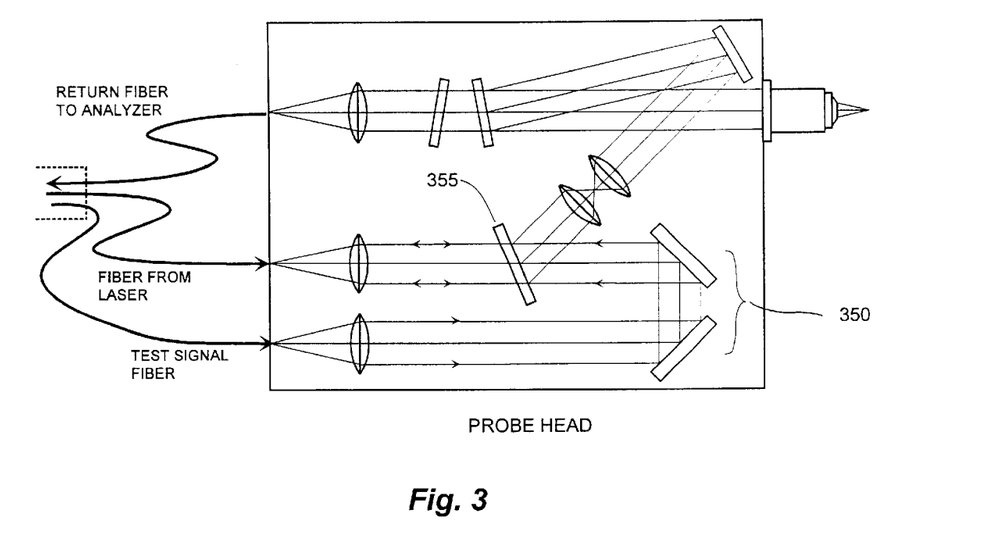
FIG. 3 is an illustration of further alternative embodiment of the invention using a set of mirrors to obviate the need for a beamsplitter.

In an alternative embodiment shown in FIG. 3, light is injected on the opposite side of the probe grating 355, in which case a separate beamsplitter is not required and simple mirrors 350 may be used. In this case, the wavelength of the test signal is chosen to be sufficiently different than the Bragg wavelength of the grating 355 so that the interlock signal is substantially transmitted through the grating without being diffracted.

It will be appreciated that there are numerous possible variants on this invention from the specific design example given here. For example, as discussed above, different light sources may be used, such as LEDs or laser diodes at other wavelengths. Alternative techniques for modulating and detecting the interlock light signal, including analog or asynchronous digital techniques, may also be used. Alternative optical probe head geometries will also be compatible with this invention. Alternative fiber-delivered laser applications, such as laser machining, using different laser wavelengths, may also benefit from this concept.

Figure 4:
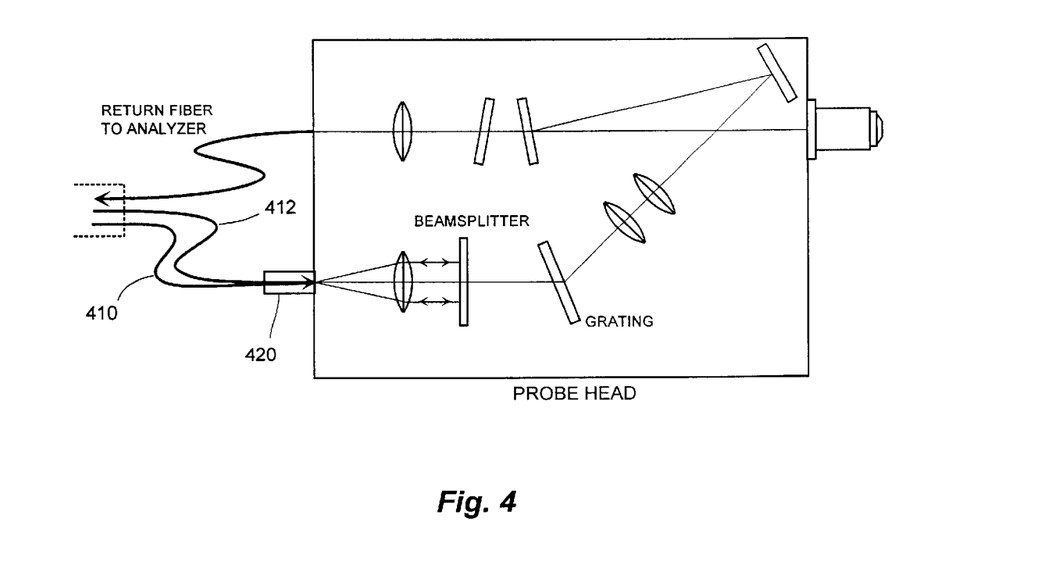
FIG. 4 is an illustration of yet a further alternative geometry using laser and test signal fibers mounted in close proximity at a remote location.

Different beamsplitter arrangements may also be used, such as the very simple and compact arrangement of FIG. 4, in which the test signal fiber 410 and the laser fiber 412 are terminated in close proximity, such as in the same connector 420, at the probe head. This uses the existing laser collimation lens to both collimate and refocus the interlock signal onto the laser fiber, requiring only the addition of a slightly tilted beamsplitter to the probe head. This level of simplicity is offset by the additional complexity of the cable connectors, however. Other methods of routing the interlock signal into the laser fiber are also straightforward.

Figure 5A:
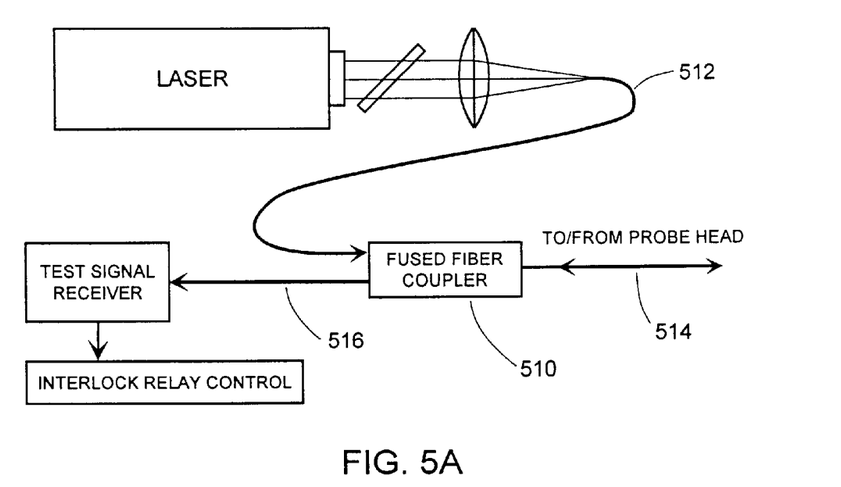
FIGS 5A, 5B and 5C are diagrams of a further alternative geometry using fiber optic couplers to inject and receive the test signal.

In still another embodiment, fiber optic coupler/splitters are used in place of separate beamsplitters as shown in FIG. 5. In FIG. 5A, a fused fiber coupler/splitter 510 receives light from the primary laser over fiber 512 and transmits it to the probe head over fiber 514. The test signal is injected into fiber 514 at the probe head as described below, and a portion of the test signal is split off by the coupler into fiber 516, which carries it to the test signal receiver. The fiber coupler 510 thus acts in an analogous manner to the beamsplitter 238 shown in FIG. 2.

Figure 5B:
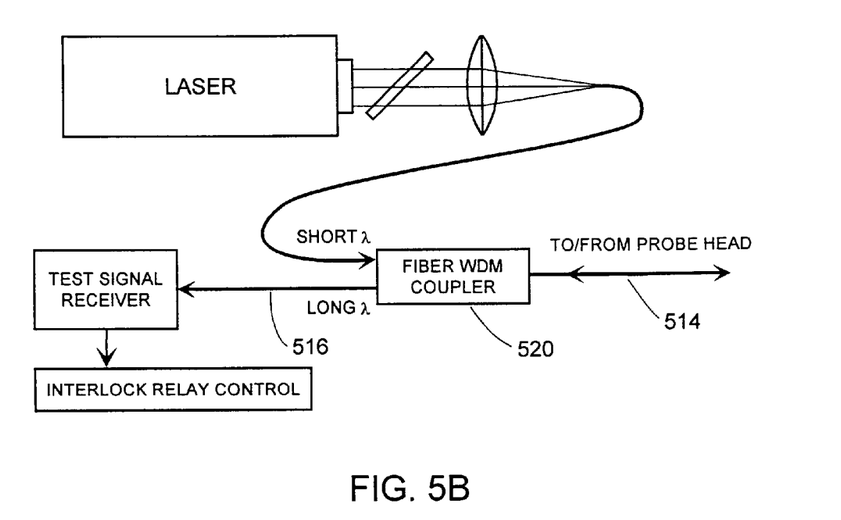

Alternative, FIG. 5B shows a fiber wavelength-division-multiplexer (WDM) coupler 520 in place of the fused fiber coupler of FIG. 5A. Again, the test signal is injected into fiber 514 at the probe head and transmitted to the coupler 520 over fiber 514. In this example, the test signal wavelength is longer than the wavelength of the primary laser, and the WDM coupler directs the test signal over fiber 516 to the Test Signal Receiver on the basis of its longer wavelength.

Figure 5C:
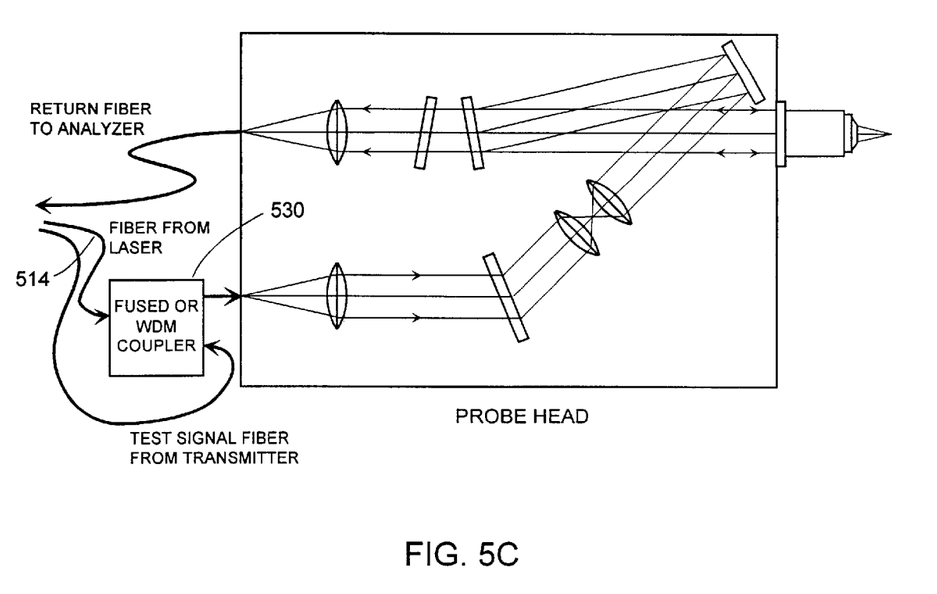

FIG. 5C shows the configuration at the probe head using a fiber optic coupler 530 to inject the test signal into fiber 514. The test signal in this arrangement is transmitted by fiber 514 in a direction opposite to that of the transmission of the primary laser light. The coupler 530 is shown in FIG. 5C as being either a fused fiber coupler or a fiber WDM coupler. While it might be optimal in certain cases to use the same type of coupler as is used at the opposite end of fiber 514, either type can be used at either end in any combination.

FIG. 5 shows the test signal injected into the fiber 514 at the probe head, or remote end of the fiber, and separated from the fiber at the first location near the laser. For the purpose of fiber breakage detection, the test signal can alternatively be injected into the fiber 514 at the first location and separated from the fiber at the remote location.

It should be clear that it is also possible to use the arrangements shown in FIGS. 2–5 in any combination for injecting the test signal into the primary laser fiber and separating the test signal from the primary laser fiber. The injection method illustrated in FIG. 3 could, for example, be combined with the separation method illustrated in FIG. 5A.

We claim:

1. A system for testing an optical fiber adapted to carry laser light, the system comprising:
    a laser outputting a beam of light having a wavelength at a first location;
    a first optical fiber having a first end supported to receive the light from the laser and a second end to deliver the light to a remote location;
    a source of an optical test signal;
    a detector at the first location for detecting the optical test signal; and
    optical elements for injecting the optical test signal into the first optical fiber and for recovering the optical test signal from the first optical fiber while the first optical fiber carries the laser light, and a second optical fiber having a first end at the first location and second end at the remote location, wherein:
        a) the optical test signal is injected into the first end of the optical fiber at the first location, recovered at the remote location, and returned to the first location through the second optical fiber for detection, or
        b) the optical test signal is carried to the remote location through the second optical fiber, injected into the second end of the first optical fiber, and recovered at the first location for detection; and
    electrical circuitry for performing a function if the detected test signal falls below a predetermined value.

2. The system of claim 1, wherein the function is to reduce the power of the laser.

3. The system of claim 1, wherein the optical test signal is at a wavelength different from that of the laser.

4. The system of claim 1, wherein the optical test signal is modulated.

5. The system of claim 1, wherein the optical test signal is encoded.

6. The system of claim 1, wherein the optical test signal from the source is compared to the test signal as detected.

7. The system of claim 6, wherein the comparison is a synchronous comparison.

8. The system of claim 1, wherein the laser includes a shut-off mechanism, and wherein the electrical detection circuitry interfaces to the shut-off circuitry.

9. The system of claim 1, wherein the beam of light is used to induce a spectral emission from a sample disposed at the remote location.

10. The system of claim 9, further including one or more additional fibers to carry the spectral emission to the first location.

11. The system of claim 9, wherein the spectral emission includes Raman scattering.

12. The system of claim 9, wherein the spectral emission includes fluorescence.

13. The system of claim 1, wherein the optical elements are selected from the group including beamsplitters, reflective elements, gratings, fiber optic coupler/splitters, or fiber WDM couplers.

14. Fiber-optic breakage detection apparatus forming part of a radiative effect measurement system, comprising:

a laser outputting a beam of light having a wavelength at a first location;

a first optical fiber having a first end supported to receive the light from the laser and a second end to deliver the light to a sample at a remote location to induce a spectral emission therefrom;

a collection optical fiber to carry the emission from the sample to the first location for analysis;

a source of an optical test signal;

a detector at the first location for detecting the optical test signal;

optical elements for injecting the optical test signal into the first optical fiber and for recovering the optical test signal from the first optical fiber while the first optical fiber carries the laser light, and a second optical fiber having a first end at the first location and second end at the remote location, wherein:

a) the optical test signal is injected into the first end of the optical fiber at the first location, recovered at the remote location, and returned to the first location through the second optical fiber for detection, or b) the optical test signal is carried to the remote location through the second optical fiber, injected into the second end of the first optical fiber, and recovered at the first location for detection; and electrical circuitry for performing a function if the detected test signal falls below a predetermined value.

15. The system of claim 14, wherein the function is to reduce the power of the laser.

16. The system of claim 14, wherein the optical test signal is at a wavelength different from that of the laser.

17. The system of claim 14, wherein the optical test signal is modulated.

18. The system of claim 14, wherein the optical test signal is encoded.

19. The system of claim 14, wherein the optical test signal from the source is compared to the test signal as detected.

20. The system of claim 14, wherein the spectral emission includes Raman scattering.

21. The system of claim 14, wherein the spectral emission includes fluorescence.

22. The system of claim 14, wherein the optical elements are selected from the group including beamsplitters, reflective elements, gratings, fiber optic coupler/splitters, or fiber WDM couplers.

23. A method of laser control, comprising the steps of:

generating a laser beam at a first location;

carrying the laser beam to a second location over a first optical fiber;

generating an optical test signal;

providing a second fiber to carry the optical test signal between the first and second locations;

injecting the optical test signal into the first optical fiber at the first location, recovering the optical test signal at the second location, and returning the recovered optical test signal to the first location over the second optical fiber, or carrying the optical test signal to the second location over the second optical fiber, injecting the optical test signal into the first optical fiber at the second location, and recovering the optical test signal at the first location;

detecting the test signal at the first location; and controlling the laser in response to the detected test signal.

24. The method of claim 23, further including the step of modulating the optical test signal.

25. The method of claim 23, further including the optical step of encoding the test signal.

26. The method of claim 23, further including the step of comparing the generated test signal to the detected test signal.

27. The method of claim 26, further including the step of synchronously comparing the generated test signal to the detected test signal.

28. The method of claim 23, further including the step of using the laser beam to induce a spectral emission from a sample disposed at the remote location.

29. The method of claim 28, further including the step of delivering the spectral emission to the first location through one or more additional optical fibers.

30. The method of claim 28, wherein the spectral emission includes Raman scattering.

31. The method of claim 28, wherein the spectral emission includes fluorescence.

* * * * *

UNITED STATES PATENT AND TRADEMARK OFFICE
CERTIFICATE OF CORRECTION

PATENT NO. : 6,259,517 B1
DATED : July 10, 2001
INVENTOR(S) : James M. Tedesco et al.

Page 1 of 1

It is certified that error appears in the above-identified patent and that said Letters Patent is hereby corrected as shown below:

<u>Column 8,</u>
Line 38, after "the" (second occurrence) delete -- optical --.
Line 39, after "the" insert -- optical --.

Signed and Sealed this

Nineteenth Day of March, 2002

Attest:

Attesting Officer

JAMES E. ROGAN
Director of the United States Patent and Trademark Office